(12) United States Patent
McFarland et al.

(10) Patent No.: US 7,212,532 B1
(45) Date of Patent: May 1, 2007

(54) MESSAGE RE-SENDING PROTOCOL FOR A WIRELESS COMMUNICATIONS SYSTEM

(75) Inventors: Robert G. McFarland, Cedar Rapids, IA (US); Justin C. Thomas, Marion, IA (US); Stephen E. Enke, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 860 days.

(21) Appl. No.: 10/027,444

(22) Filed: Dec. 21, 2001

(51) Int. Cl.
*H04L 12/56* (2006.01)
*G08C 25/02* (2006.01)

(52) U.S. Cl. ..................... 370/394; 714/748
(58) Field of Classification Search ............... 370/337, 370/347, 343–345, 328–329, 336, 310.2, 370/216, 242, 394; 714/746, 748–750, 819, 714/822, 824, 799, 2, 6, 16, 18, 25, 32, 48, 714/49, 710, 714, 715; 709/237
See application file for complete search history.

(56) References Cited

U.S. PATENT DOCUMENTS

| | | | | |
|---|---|---|---|---|
| 4,553,263 | A * | 11/1985 | Smith et al. | 455/509 |
| 5,500,864 | A * | 3/1996 | Gonia et al. | 714/807 |
| 5,682,148 | A * | 10/1997 | Gaskill et al. | 340/7.31 |
| 5,734,643 | A * | 3/1998 | Rondeau | 370/279 |
| 5,912,902 | A * | 6/1999 | Monroe | 714/746 |
| 6,567,395 | B1 * | 5/2003 | Miller | 370/347 |
| 2002/0032884 | A1 * | 3/2002 | Kobata et al. | 714/18 |

FOREIGN PATENT DOCUMENTS

| | | | | |
|---|---|---|---|---|
| JP | 56136056 | A | * | 10/1981 |
| JP | 60062758 | A | * | 4/1985 |
| JP | 60093855 | A | * | 5/1985 |
| JP | 03010547 | A | * | 1/1991 |

OTHER PUBLICATIONS

Co-pending patent application entitled "Method And System For Data Collision Avoidance In A Wireless Communications System" filed on an even date, inventor R. McFarland et al.

* cited by examiner

*Primary Examiner*—Chau Nguyen
*Assistant Examiner*—Kerri M Rose
(74) *Attorney, Agent, or Firm*—Nathan O. Jensen; Kyle Eppele

(57) ABSTRACT

In a wireless network having a plurality of nodes configured to send and receive messages between each other, a method is disclosed for determining whether a message sent from a sending node to a receiving node has been successfully transmitted. The sending node transmits an identifying command to the receiving node that describes the sent message. The receiving node compares the description of the sent message with a received message that the receiving node has received. The receiving node responds to the sending node, said response indicating to the sending node the results of the comparison between the description of the sent message and the received message. The sending node transmits a portion of the sent message if the comparison between the received message and the description of the sent message indicates that the receiving node has not yet received the portion of the sent message.

19 Claims, 4 Drawing Sheets

| Reference No. | Description | Size in Bytes |
|---|---|---|
| 30 | Inquiry Packet | 52 |
| 32 | Command section | 2 |
| 34 | File Ident. Section | 50 |
| | File name | 30 |
| | Timestamp | 8 |
| | Size of file | 4 |
| | CRC of file | 4 |
| | Destination address | 4 |
| 40 | Response packet | 14 |
| 42 | Command section | 2 |
| 44 | Offset | 4 |
| 46 | Length section | 4 |
| 48 | Bytes received | 4 |
| 50 | File fragment packet | Variable |
| 52 | Command section | 2 |
| 54 | Offset | 4 |
| 56 | Length section | 4 |
| 58 | File fragment | Variable |

*Figure 6*

MESSAGE RE-SENDING PROTOCOL FOR A WIRELESS COMMUNICATIONS SYSTEM

CROSS-REFERENCE TO RELATED APPLICATIONS

This application is related to U.S. Pat. No. 7,002,947, issued Feb. 21, 2006, entitled "METHOD AND SYSTEM FOR DATA COLLISION AVOIDANCE IN A WIRELESS COMMUNICATIONS SYSTEM," invented by Robert T. McFarland and Stephen E. Enke, said patent being filed concurrently herewith and incorporated by reference herein in its entirety.

FIELD OF THE INVENTION

The invention relates to communications, and more particularly, to a method and system for sending messages, or portions thereof, over a wireless network.

BACKGROUND OF THE INVENTION

Single-channel wireless communications networks are relatively simple to operate and provide an efficient method for a finite number of participants to exchange data. A common network structure is to permit one participant, or node, to establish a link over the network channel so that it may send a message to another participant, or node. This arrangement is currently being used to communicate STANAG 5066 data over a single-channel wireless HF network.

Wireless networks, especially HF networks, may be susceptible to interference during transmission. Such interference may cause a message sent over the network to not be completely received. Known HF networks employ a protocol in which an entire message is re-sent if any portion of the message has not been received. If large files are to be sent over the network, such a protocol has the potential to slow down or even halt transmission of data over the network. This is especially troubling if the network operates over a single channel, in which case every node in the network must wait until a message between two of the nodes is successfully transmitted.

It is therefore an object of the invention to increase the amount of data that can be transmitted on a single-channel wireless network.

It is another object of the invention to compensate for the adverse effects of interference encountered on a single-channel wireless network.

A feature of the invention is a message protocol that only re-sends portions of a previously sent message that are acknowledged as unreceived.

An advantage of the invention is an increase in the efficiency of message transmissions over a single-channel wireless network.

SUMMARY OF THE INVENTION

The invention provides a method for determining whether a message sent from a sending node to a receiving node has been successfully transmitted. The method is usable in a wireless network having a plurality of nodes configured to send and receive messages between each other. According to the method, the sending node transmits an identifying command to the receiving node that describes the sent message. The receiving node compares the description of the sent message with a received message that the receiving node has received. The receiving node responds to the sending node, said response indicating to the sending node the results of the comparison between the description of the sent message and the received message. The sending node transmits a portion of the sent message if the comparison between the received message and the description of the sent message indicates that the receiving node has not yet received the portion of the sent message.

The invention also provides a method of determining if all portions of a message have been successfully transmitted from a first node in a single-channel, wireless HF communications network to a second node in the network. Information about the transmitted message is sent to the second node. The information includes at least a name of the transmitted message and a size of the transmitted message. The sent information is compared to a received message that was received by the second node. The first node is informed of a portion of the transmitted message that was transmitted by the first node but not received by the second node. The portion of the message that was transmitted by the first node but not received by the second node is transmitted to the second node.

The invention further provides a single-channel wireless communications network. The network includes a first node and a second node. The first node is configured to send to the second node a message over the single channel and to transmit an inquiry command that communicates information regarding the sent message. The second node is configured to determine, using the information in the inquiry command, whether the sent message was correctly received. The second node transmits response information to the first node. The response information indicates whether a portion of the sent message was not received by the second node. The first node is configured to retransmit the portion of the sent message that was not received by the second node.

BRIEF DESCRIPTION OF THE DRAWINGS

FIG. 6 is a chart showing suggested packet sizes according to an embodiment of the invention.

DETAILED DESCRIPTION OF THE DRAWINGS

Figure 1:
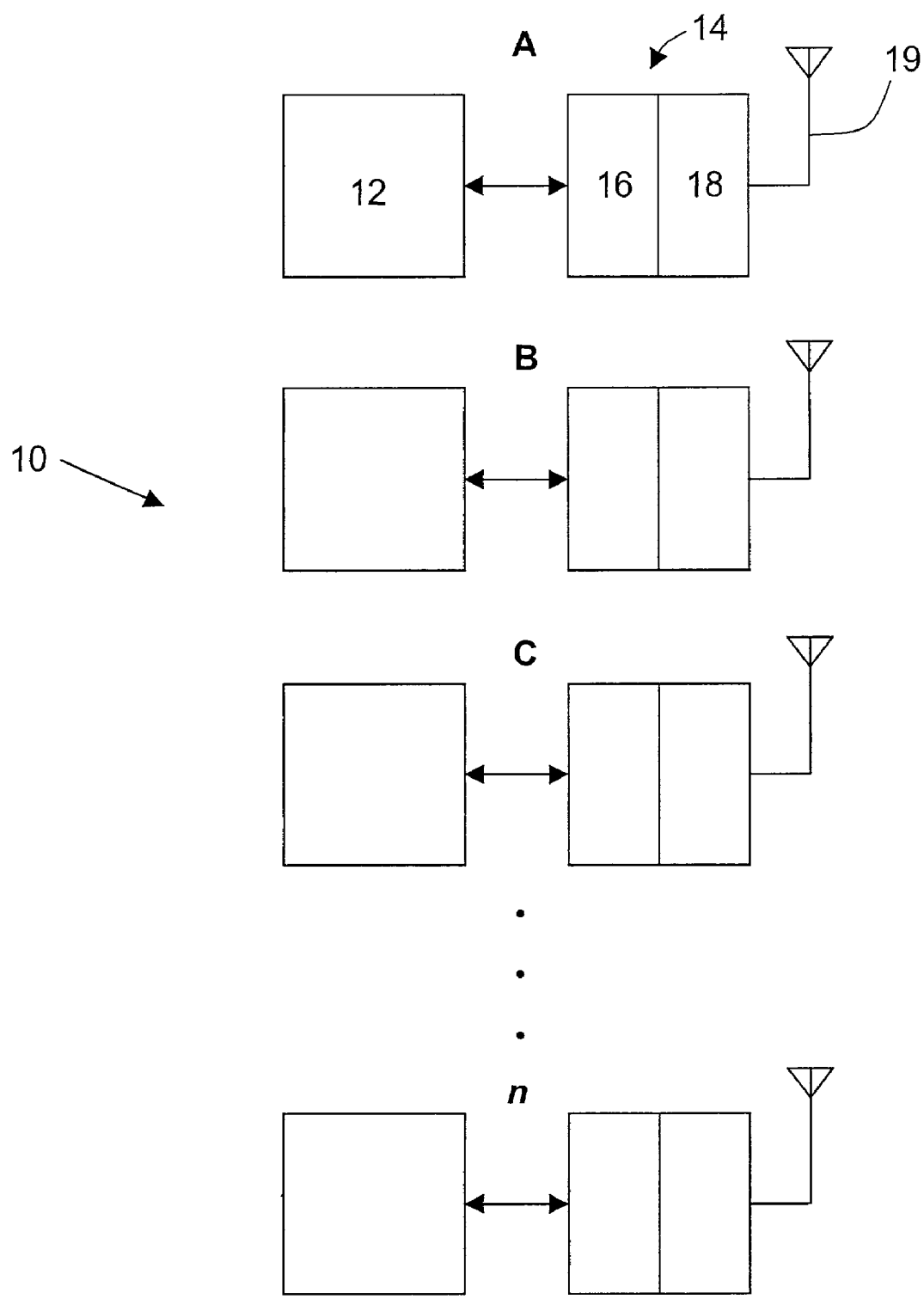
FIG. 1 is a schematic diagram showing a plurality of nodes in a wireless communications network.

Turning now to the drawings, in which like reference numbers designate like components, an embodiment of the invention is schematically shown in FIG. 1. A wireless communications network 10 includes a plurality of nodes, which are identified by the letters A, B, C, . . . n. Each node includes a computer 12, which may include a processor, memory, a display, and other components. Computer 12 also includes software that controls the transmission and reception of data, such as HF Messenger™, manufactured by Rockwell Collins, Inc. of Cedar Rapids, Iowa. Computer 12 may be considered a data source, or may be operationally connected to an external data source (not shown).

Computer 12 is connected to a wireless communications module 14, which includes a modem 16. Modem 16 converts data from computer 12 into a commonly accepted communications format and converts information in the communications format into a format useable by computer 12. The output of modem 16 is sent to a radio 18, which, through antenna 19, transmits and receives data over a wireless network. In the present invention, the radios in all nodes A, B, C, . . . n transmit over a single channel. Each node is configured to communicate with other nodes one at a time, i.e., if node A desires to communicate with nodes B and C, it must do so sequentially and not simultaneously.

Figure 2:
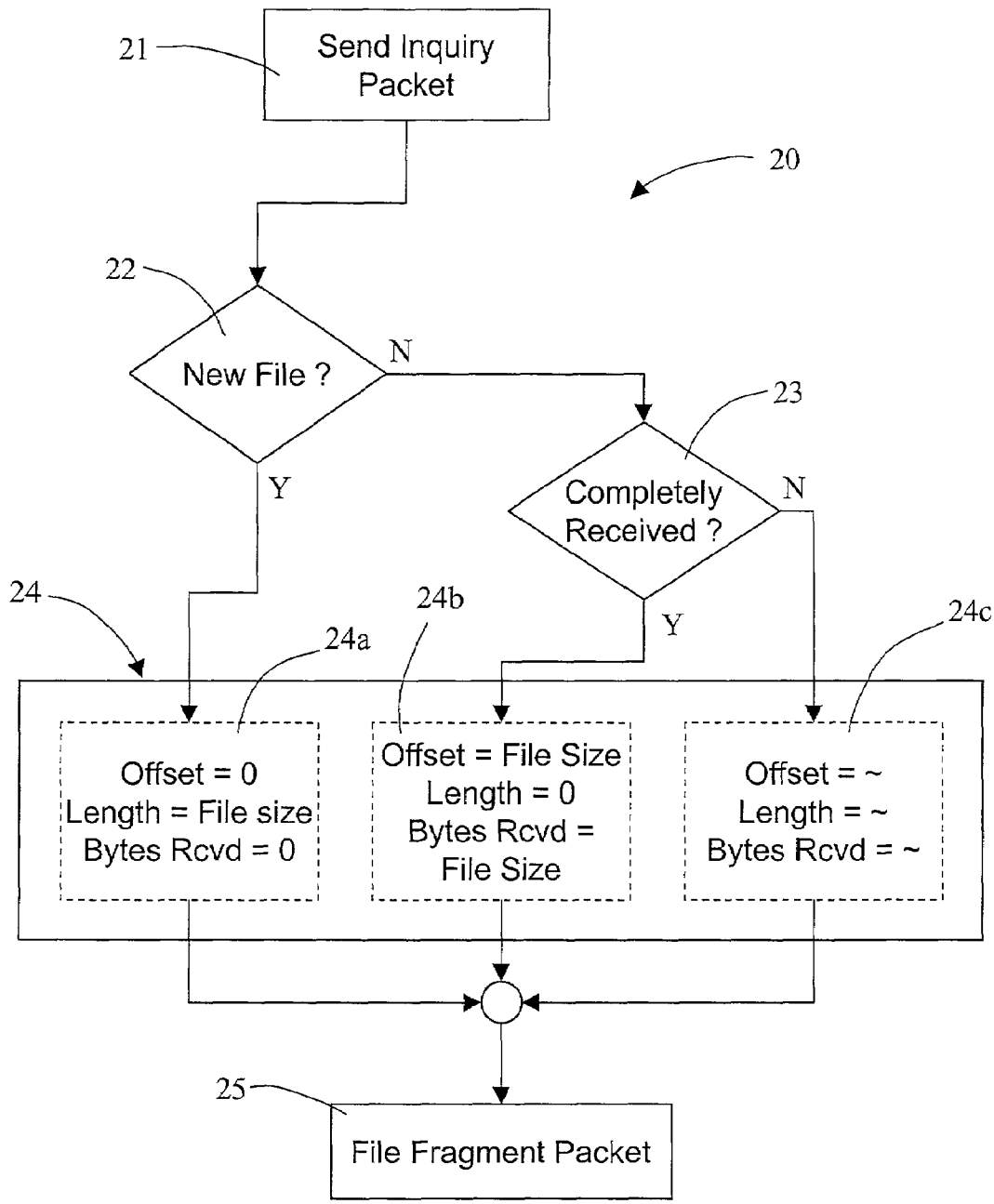
FIG. 2 is a flowchart of a method according to the invention.
Figure 3:
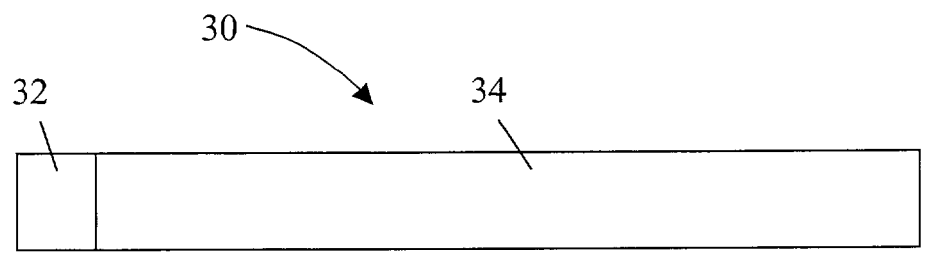
FIG. 3 is a schematic diagram of a command data packet according to the invention.

According to the invention, if node A desires to send a message or file to node B, node A establishes a link with node B and sends an inquiry packet to node B. The inquiry packet sends information about the to-be-sent file (such as the name and size of the file). The inquiry packet is schematically shown at 30 in FIG. 3, and the act of sending the inquiry packet is represented as step 21 in the method 20 of the invention depicted in FIG. 2. Inquiry packet 30 may also be termed a Resume Message Protocol Command Packet or a Resume Message Command. As shown in FIG. 3, Inquiry packet 30 includes a command section 32, which identifies the command to node B, and a file identification section 34, which supplies information about the file sent by node A. The information in file identification section 34 may include the file name, a timestamp correlating to the file, the size of the file, a cyclic redundancy checksum (CRC) or other type of checksum relating to the file, and a destination address.

Node B compares the information received in file identification section 34 of inquiry packet 30 with previously received files. If the information in file identification section 34 does not correspond to any files that node B has previously received, then node B assumes that the file identified in file identification section 34 is a new file (step 22), and node B reserves adequate storage space to accommodate the new incoming file. If node B determines that the file identified in file identification section 34 corresponds to a previously-received file, then in step 23 node B determines whether the file has been completely received. This may be done by comparing the size of the file that node B has received with the file size indicated in file identification section 34.

Figure 4:
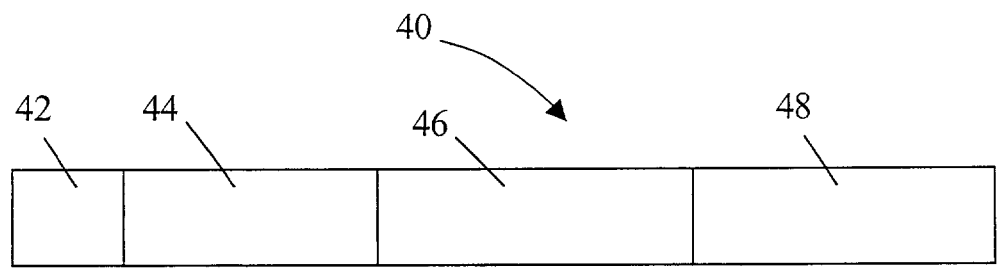
FIG. 4 is a schematic diagram of a response data packet according to the invention.

Once steps 22 and (if necessary) 23 have been performed, in step 24 node B transmits a response packet 40 (FIG. 4) to node A. Response packet 40 may also be termed a Gap Request Response Packet. Response packet 40 includes a command section 42, which identifies the command to node A. Response packet 40 also includes an offset 44 into the file that indicates the beginning of any gap in the transmitted file. Response packet 40 further includes a length section 46 that communicates to node A the length of the portion of the file (or the gap in the file) that node B has not yet received. Response packet 40 further includes a bytes received section 48 that communicates to node A how much of the file node B has received. In this manner node B can easily communicate to node A the percentage of the file received by node B.

The contents of offset 44, length section 46, and bytes received section 48 vary depending on what portion, if any, of the file has been received by node B. If node B has determined in step 22 (FIG. 2) that the file identified in file identification section 34 has not yet been sent, then response packet 40 will include an offset 44 containing a value of zero, a length section 46 containing a value equal to the file size communicated in information section 34, and a bytes received section 48 containing a value of zero (step 24a). If node B has determined in step 23 that the file identified in file identification section 34 has been completely received, then response packet 40 will include a value in offset 44 equal to the file size communicated in information section 34, a value in length section 46 equal to zero, and a bytes received section 48 having a value equal to the size of the file that has been received (step 24b). However, if node B has determined in step 23 that only a portion of the file identified in file identification section 34 has been received, then response packet 40 will include an offset 44 having a value indicating the location of the beginning of a gap in the transmission, a length section 46 having a value equal to the size of the file portion that has not been received, and a bytes received section 48 having a value equal to the size of the file that has been received (step 24c).

Figure 5:
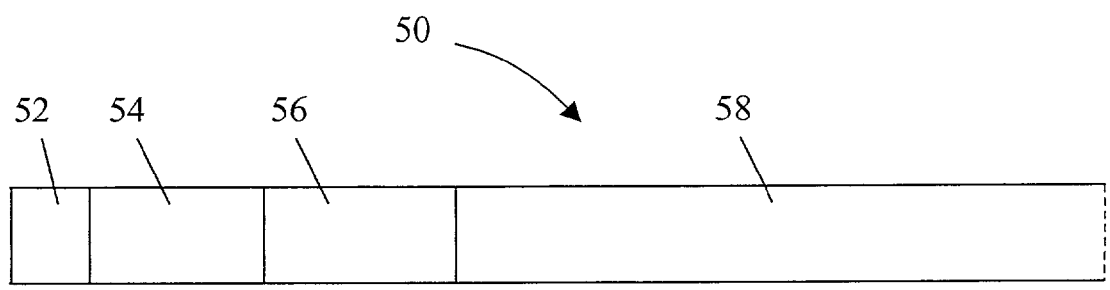
FIG. 5 is a schematic diagram of a file fragment packet according the invention.

When response packet 40 has been received by node A, in step 25 node A sends a file fragment packet 50 that includes the fragment, or portion, of the file that has not been received by node B. File fragment packet 50 (FIG. 5), which may also be called a Resume Message Protocol File Fragment Packet, may include a command section 52 similar to command sections 32 and 42, an offset 54 corresponding to the location of the gap in the file, a length section 56 containing a value confirming the size of the file portion that has not been received by node B, and a file fragment section 58 that contains the portion or fragment of the file that has not been received by node B. Node B may transmit additional response packets to node A if further portions of the file are required to be retransmitted. When the file has been completely and correctly received, Node B will transmit a response packet similar to that represented by step 24b in FIG. 2, and no further inquiry packets regarding the file will be sent.

If a response packet is not received by node A within a predetermined time, node A will send the entire file. This feature ensures that the invention may be used in wireless networks in which one or more of the nodes may not be configured to send or receive response packets as described herein.

The size of each of inquiry packet 30, response packet 40 and file fragment packet 50, and their respective sections or portions, may vary depending on the data to be transmitted and on the limitations of the wireless network. It has been found that the packet and packet portion sizes (in bytes) shown in the chart 60 of FIG. 6 are sufficient to communicate necessary information over a single-channel HF wireless network having a finite number of nodes.

An advantage of the invention is that the requirement to re-send entire files over a wireless network is substantially reduced, if not eliminated.

Another advantage of the invention is its interoperability with network nodes not being configured to send and/or receive response packets 40. This allows the invention to be used with previously developed and commonly accepted technology.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. In a wireless network having a plurality of nodes configured to send and receive messages between each other, a method for determining whether a message completely sent from a sending node to a receiving node has been successfully transmitted, comprising:

the sending node transmitting an identifying command to the receiving node that describes the sent message;

the receiving node comparing the description of the sent message with a received message that the receiving node has received;

the receiving node responding to the sending node, said response indicating to the sending node the results of the comparison between the description of the sent message and the received message; and the sending node transmitting a portion of the sent message if the comparison between the received message and the description of the sent message indicates that the receiving node has not yet received the portion of the sent message.

2. The method of claim 1, wherein the receiving node identifies a size of the portion of the sent message that has not been received.

3. The method of claim 2, wherein the receiving node identifies a location of the portion of the message that has not been received.

4. The method of claim 1, wherein the received message has a size, and further wherein the receiving node identifies the size of the received message.

5. The method of claim 1, further including:
re-transmitting the sent message to the receiving node if a predetermined time elapses before the response is received by the sending node.

6. The method of claim 1, wherein the description of the sent message includes at least a name of the sent message and a size of the sent message.

7. The method of claim 6, wherein the description of the sent message further includes at least one of a time stamp, a checksum related to the sent message, and a destination address.

8. The method of claim 1, wherein the transmissions between the first node and the second node are accomplished over a frequency in the HF spectrum.

9. A method of determining if a message has been successfully transmitted from a first node in a single-channel, wireless HF communications network to a second node in the network, the method comprising:

sending information about the transmitted message to the second node, the information including at least a name of the transmitted message and a size of the transmitted message;

comparing the sent information to a received message that was completely sent by the first node and received by the second node;

informing the first node of a portion of the transmitted message that was transmitted by the first node but not received by the second node;

transmitting to the second node said portion of the message that was transmitted by the first node but not received by the second node.

10. The method of claim 9, wherein the received message has a size, and wherein the comparing step includes comparing the size of the transmitted message with the size of the received message.

11. The method of claim 9, wherein the portion of the message that was transmitted but not received by the second node has a size, and further wherein the informing step includes informing the first node of the size of the portion of the message that was transmitted but not received by the second node.

12. The method of claim 11, wherein the portion of the message that was transmitted but not received by the second node is identifiable by a position in the transmitted message, and further wherein the informing step includes informing the first node of said position.

13. The method of claim 9, further including re-transmitting the transmitted message if a predetermined time elapses before the first node is informed of a portion of the transmitted message that not received by the second node.

14. The method of claim 9, wherein the information about the transmitted message that is sent to the second node further includes at least one of a time stamp, a checksum related to the sent message, and a destination address.

15. A single-channel wireless communications network, comprising:

a first node and a second node, the first node configured to send to the second node a message over the single channel and to transmit an inquiry command that communicates information regarding the sent message, the second node configured to determine, after the message is completely sent and using the information in the inquiry command, whether the sent message was correctly received;

wherein the second node transmits response information to the first node, the response information indicating whether a portion of the sent message was not received by the second node; and wherein the first node is configured to retransmit the portion of the sent message that was not received by the second node.

16. The single-channel wireless communications system of claim 15, wherein the portion of the sent message that was not received has a size, and further wherein the second node is configured to identify said size to the first node.

17. The single-channel wireless communications system of claim 16, wherein the portion of the sent message that was not received has a location within the message, and further wherein the second node is configured to communicate said location to the first node.

18. The single-channel wireless communications system of claim 15, wherein the first node is configured to re-send the sent message if a predetermined time elapses before the response message is received by the first node.

19. The single-channel wireless communications system of claim 15, wherein the first node and second node are configured to transmit over a frequency in the HF spectrum.

* * * * *